Jan. 21, 1969   J. W. LISKA   3,422,873

TIRE CORD

Filed July 24, 1967

3,422,873
TIRE CORD
John W. Liska, Cuyahoga Falls, Ohio, assignor to The
 Firestone Tire & Rubber Company, Akron, Ohio, a
 corporation of Ohio
Continuation-in-part of application Ser. No. 457,745,
 May 21, 1965. This application July 24, 1967, Ser.
 No. 660,157
U.S. Cl. 152—357                                    2 Claims
Int. Cl. B60c 9/02; D02g 3/04, 3/48

ABSTRACT OF THE DISCLOSURE

The invention provides a two ply tire cord which is made from nylon and polyester yarns, each twisted in one direction with critically different twist multipliers and cabled together in the opposite direction with a critical twist multiplier to produce a tire cord having the desirable characteristics of both the nylon and polyester materials.

---

This application is a continuation-in-part of my copending application Ser. No. 457,745, filed May 21, 1965, now abandoned.

Figure 1:
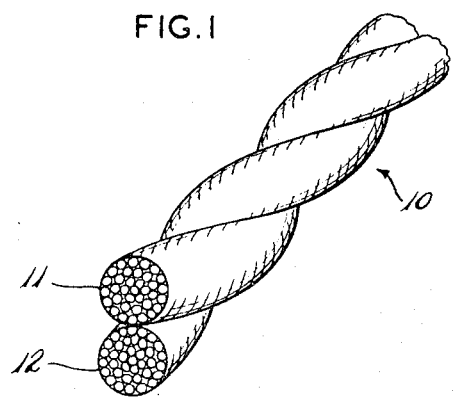
Figure 2:
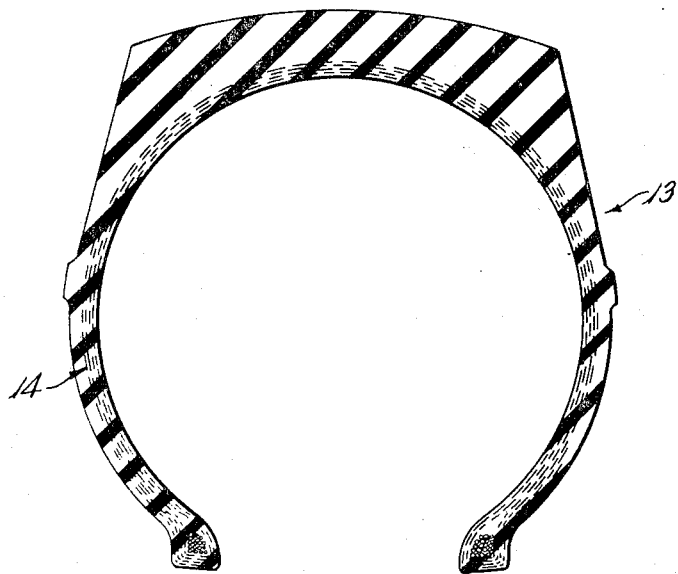

The preferred embodiment in the invention as shown in FIGURE 1 comprises a 1260 denier nylon tire yarn 11 which has 9 turns per inch in the so-called Z or S direction and a 1260 denier polyester yarn 12 which has 12 turns per inch in the same direction as the twist of the nylon yarn. The nylon and polyester yarns are then cabled with a twist of 10 turns per inch in a direction opposite to the twist of the nylon and polyester yarns. FIGURE 2 is a sectional view of a tire 13 having a plurality of plies 14 incorporating the tire cords 10 of the invention.

The above description of a preferred embodiment involves nylon and polyester yarns having specific deniers of 1260. The invention is in no means limited to this. In order to translate the scope of the invention into universal terms, the device of "twist multiplier" is employed herein. As used herein, twist multiplier is equal to the product of the number of turns per inch and the square root of the denier.

Expressed in terms of twist multipliers the twist multiplier of the nylon yarns of the above described preferred embodiment was 319; similarly the twist multiplier of the polyester yarn was 426 and the twist multiplier of the cabled tire cord was 502. Tire cords of the invention are 2-ply tire cords comprising a nylon ply having a twist multiplier in the range of 250 to 390 and a polyester ply having a twist multiplier in the range of 355 to 495, the nylon and polyester plies each being twisted in one direction and the two plies being twisted together in the opposite direction at a twist multiplier of from 400 to 600.

The primary advantages of the tirecord of the present invention are illustrated in Table I.

TABLE I

| | Tirecord of the Invention | Nylon Tirecord | Polyester Tirecord |
|---|---|---|---|
| Linear Density (denier) | 2,835 | 2,868 | 2,681 |
| Tensile Properties: | | | |
| Elong. at 15 lb. (percent) | 7.1 | 9.2 | 4.2 |
| Elong. at Break (percent) | 17.2 | 20.0 | 12.0 |
| Breaking load (lb.) | 40.3 | 38.4 | 39.9 |
| Tenacity (gm.-den.$^{-1}$) | 6.45 | 6.08 | 6.75 |
| Initial Modulus (gm.-den.$^{-1}$) | 32.3 | 26.4 | 74.6 |
| Response Lag (mil) | 109 | 144 | 27 |

In the above table, the tire cords tested were in each case of 1260/2 construction. In the tire cord of the invention the nylon ply had a twist of 9 turns per inch in the Z direction, the polyester ply had a twist of 12 turns per inch in the Z direction and the two plies were cabled together with a twist of 10 turns per inch in the S direction. Special attention is called to the fact that as a result of the different degree of twist of the component dissimilar plies, the tire cord of the invention can be considered unbalanced. The tenacity data is indicative of the strength of the tire cord. It should be noted that the tenacity for the tire cord of the invention is approximately equivalent to the average of the tenacities of the all nylon cord and all the polyester cord. This shows that the composite tire cord of the invention takes full advantage of the maximum strengths of each of its dissimilar components. Composite nylon/polyester tire cords of balanced twist (wherein the twists of both the nylon and the polyester plies are the same), which are outside the scope of the invention, have lower tenacities than tire cords of the invention by approximately 10%. The "response lag" reported in the table is a laboratory test for evaluating the tendency of a tire cord to flatspot in a tire. In general terms the lower the response lag, the less is the tendency of the tire cord to flatspot in a tire. It will be noted that the tendency to flatspot of the tire cord of the invention is markedly less than the tendency to flatspot of the all nylon tire cord.

Two pneumatic passenger tires, size 7.75–14, of two body ply construction utilizing the tirecord of the invention, were built and vulcanized by means of standard tire building and curing apparatus. The two tires were subjected to a standard fleet road test for 12,000 miles and an additional test at an overload of 11 percent for 8,000 miles. There were no failures and there was no tread cracking. After 20,000 miles the wear was rated at 62.3 miles per 0.001 inch of tread loss, which was approximately seven percent better than commercial tires of the same construction utilizing regular commercial nylon tirecord in the bodies of the tires.

Cords were removed from each of the two test tires of this example after completion of the 20,000 mile road test and were then tested. The following test results are each the average of 60 breaks:

| | Percent Elongation at Break | Breaking Load in Pounds |
|---|---|---|
| Test Tire: | | |
| 1 | 16.4 | 40.1 |
| 2 | 16.4 | 40.1 |
| Original properties of tirecord utilized in test | 17.2 | 40.3 |

These tensile-elongation properties show no flex fatigue of the tirecord after 20,000 miles of service.

Eight 7.75-14 two-ply tires employing as the carcass material the composite tire cord of the invention were each subjected to a flat spotting test by being run against a ten foot diameter test wheel. Under the test the tires were run against the test wheel for 15 minutes at 80 miles per hour for the purpose of warming up the tires. The test wheel was stopped and the tires allowed to rest 16 hours at ambient temperature. The test wheel was started again taking 30 seconds to reach 30 miles per hour. At this time the maximum vertical acceleration of the axle was measured in $g$ acceleration units. This $g$ value indicates the flat spotting of the tires being tested; the higher the number, the greater the flat spotting. The average flat spotting of the eight tires of the invention in $g$ units was 2.7. High quality all nylon cord two-ply tires exhibit flat spotting expressed in $g$ units in the range of 4.0 to 5.0. High quality two-ply all polyester cord tires exhibit flat spotting in $g$ units of the order of 2.0. It is seen that the composite tire cords of the invention have very excellent flat spotting characteristics.

I claim:
1. A two-ply tire cord comprising a nylon ply having a twist multiplier in the range of 250 to 390 and a polyester ply having a twist multiplier in the range of 355 to 495, the nylon and polyester plies each being twisted in one direction and the two plies being twisted together in the opposite direction at a twist multiplier of from 400 to 600 to provide a tire cord.

2. A pneumatic tire comprising the tire cord of claim 1.

References Cited

UNITED STATES PATENTS

| | | | |
|---|---|---|---|
| 2,199,400 | 5/1940 | Geier et al. | 57—140 |
| 2,235,867 | 3/1941 | Castricum et al. | 57—140 XR |
| 2,313,058 | 3/1943 | Francis | 57—140 |
| 2,448,782 | 9/1948 | Davis | 57—140 |
| 2,575,753 | 11/1951 | Foster | 57—156 |
| 2,745,240 | 5/1956 | Brant | 57—140 |
| 2,755,214 | 7/1956 | Lyons et al. | |
| 2,890,567 | 6/1959 | Taylor et al. | 57—140 |
| 3,160,193 | 12/1964 | Baggett et al. | 152—359 |
| 3,233,648 | 2/1966 | Kovac et al. | 152—359 |
| 3,253,638 | 5/1966 | Kersker et al. | 152—359 |

DONALD E. WATKINS, *Primary Examiner.*

U.S. Cl. X.R.

57—140